United States Patent [19]

Reid et al.

[11] Patent Number: 4,779,387
[45] Date of Patent: Oct. 25, 1988

[54] METHOD AND APPARATUS FOR AUTOMATICALLY BUFFING A GOLF BALL

[75] Inventors: Walter L. Reid; Ralph L. Delano, both of Mattapoisett; Michael Ashley, Acushnet, all of Mass.

[73] Assignee: Acushnet Company, New Bedford, Mass.

[21] Appl. No.: 154,438

[22] Filed: Feb. 5, 1988

Related U.S. Application Data

[63] Continuation of Ser. No. 879,336, Jun. 27, 1986, abandoned.

[51] Int. Cl.⁴ .......................... B24B 5/32; B24B 5/36
[52] U.S. Cl. ........................ 51/289 R; 51/4; 51/5 C; 51/145 T; 51/145 R; 51/328; 51/215 AR; 51/165.75; 83/32; 83/914
[58] Field of Search ............. 51/4, 5 B, 5 C, 5 R, 51/135 R, 145 R, 141, 145 T, 165.75, 281 R, 289 R, 328, 215 R, 215 AR, 215 HM, 237 T, 277; 83/DIG. 923, DIG. 914, 32; 225/1, 104, 105; 156/146; 425/806; 264/161, 162

[56] References Cited

U.S. PATENT DOCUMENTS

| | | | |
|---|---|---|---|
| 2,392,459 | 1/1946 | Casalino | 83/914 |
| 3,095,674 | 7/1963 | Lee | 51/141 |
| 3,555,737 | 1/1971 | Terakado et al. | 51/5 R |
| 3,561,908 | 2/1971 | Reinfeld | 51/5 C |
| 3,711,997 | 1/1973 | Kushigian | 51/215 H X |
| 3,722,144 | 3/1973 | Rickrode et al. | 51/328 X |
| 3,903,656 | 9/1975 | Binder | 51/277 X |
| 3,994,100 | 11/1976 | Shelden et al. | 51/145 T |
| 4,499,693 | 2/1985 | Fatula, Sr. et al. | 51/145 R X |
| 4,520,595 | 6/1985 | Diener | 51/237 T X |

Primary Examiner—Robert P. Olszewski
Attorney, Agent, or Firm—Lucas & Just

[57] ABSTRACT

An automatic buffing machine and method for automatically buffing a golf ball are disclosed. The golf ball is oriented such that the flash ring is in a predetermined plane and then the flash ring is removed. The golf ball matrix is preferably utilized to orient the golf ball and both cutting and sanding are preferably used to remove the flash ring.

15 Claims, 8 Drawing Sheets

METHOD AND APPARATUS FOR AUTOMATICALLY BUFFING A GOLF BALL

This is a continuation of application Ser. No. 879,336 filed June 27, 1986, now abandoned.

This invention relates to golf balls and more particularly to a method and apparatus for automatically removing the flash ring on a golf ball.

Golf ball covers are generally formed in one of two ways, either by molding two hollow, semi-circular cover halves about a core or by injection molding cover stock around a core. The molding of two semi-circular cover halves around a core is conventional and is generally accomplished by means of a frame containing a plurality of paired ball cup molds. Each ball cup mold bears a dimple pattern which is implanted on the cover halves when the frame is closed and the cover halves are subjected to heat and pressure. The heat and pressure cause the cover halves to join and form a solid, dimpled cover. Excess cover stock seeps out from between the pair of ball cup molds and interconnects the balls to form a matrix of balls, each ball being connected to its neighbors by the excess or overflow of cover stock.

Injection molding of golf ball covers is accomplished in a conventional manner by placing cores inside retractable pin ball cup molds and injecting cover stock around the core. Generally the ball cup molds are housed in a frame. The ball cup molds are such that cover stock can be forced into the ball cup molds through a runner system and form a matrix as described above.

In either case, when the balls are detached from the matrix a ring of cover stock, a flash ring, remains, encircling the ball. This unwanted flash ring is generally removed by a buffing operation.

Typically, the flash ring is removed by an operator using a manual buffing machine. An operator orients the flash ring in a vertical plane and places the ball into a rotating, holding fixture. The operator then brings a spinning, grinding wheel against the flash ring to grind away this unwanted material.

If the wheel is held too long or pushed too hard against the ball, too much material is removed and the ball's seam appears as a flat band around the ball. If the wheel is not applied long enough, or without enough force, the flash ring remains on the ball. Both of these conditions are unacceptable. The length of time and the amount of pressure with which the grinding wheel engages the ball is determined by the individual operator and varies from ball to ball.

Generally, one operator uses one manual buffing machine and buffs balls continuously for an eight hour shift. This is a repetitive job with a high fatigue factor. The percentage of balls with improperly buffed flash rings due to the operator holding the ball against the grinding wheel for either too short a period of time or for too long a period of time varies with the skill of each individual operator.

A method and apparatus for automatically removing the flash ring from a golf ball has now been discovered which eliminates the need for an individual operator to separately and manually remove the flash ring from each individual ball. The present invention markedly increases the percentage of balls with properly buffed flash rings.

One embodiment of the present invention provides for an automatic inspection of each ball after it has been removed from the matrix. Thus, for example, a ball that is out-of-round due to the molding process is automatically rejected prior to the buffing operation.

Broadly, the present invention orients a golf ball such that the flash ring is in a predetermined plane and removes the flash ring. Preferably, the flash ring is in a horizontal plane.

Orientation of the golf ball can be accomplished by manual orientation or by automatic orientation.

Manual orientation is accomplished by an individual operator orienting the balls such that the flash ring is in a horizontal plane. A suitable automatic device can suitably be a vibrating orientation device. This is a conventional piece of equipment which has at least one cup similar to a ball cup having a dimple pattern similar to that of the golf ball or a portion of the golf ball on the bottom and a security arm on top. The ball is placed in between the cup and the arm, the cup being below the ball while the arm is above the ball. The ball is vibrated until the dimple pattern on the ball is aligned with the dimple pattern in the cup.

Another automatic means for orienting the golf ball is to automatically maintain the golf ball's orientation obtained from the matrix. This method is preferred. In this embodiment the balls are carefully removed from the mold while they are all interconnected by the flash and overflow. The matrix is fed to a die punch which pushes the balls out of the matrix and onto a carrying apparatus. The die punch is oriented in a vertical plane while the matrix is first aligned in a horizontal plane and then fed to the die punch in the horizontal plane. By aligning the matrix in the horizontal plane, the flash ring is also aligned in the horizontal plane. The carrying apparatus, typically referred to as a car, is equipped with a plurality of receiving cups. Each receiving cup is shaped like a ball cup mold and may have a dimple pattern similar to that of the golf ball. The matrix is loosely held so die cup punch can align balls when the die punch pushes the ball out of the matrix and into the waiting car's receiving cup which is positioned directly below the die punch. These steps maintain the horizontal orientation of the flash ring.

Both the vibrating orientation device and the device for maintaining the ball's orientation from the matrix preferably utilize the dimple pattern on the golf ball to orient the flash ring in the horizontal plane. It is evident to one of skill in the art that the flash ring itself could also be used to orient the flash ring on the ball in the horizontal.

Having oriented the ball with the flash ring in the horizontal position, the next step is to automatically remove the flash ring. In order to remove the flash ring from the ball, each individual ball is unloaded from the car and loaded into a holder by a loader. The loader maintains the orientation of the flash ring in the horizontal plane during the unloading of the car and the loading of the holder. The holder preferably has a bottom cup into which the ball is placed and a security arm which is placed on top of the ball. The bottom cup of the holder preferably has a dimple pattern similar to that of the golf ball. The holder then holds and spins the golf ball during the step of removing the flash ring.

Preferably, after placing the golf ball in the holder but before removing the flash ring, the height of the ball is checked. This check confirms the orientation of the flash ring and also checks for balls which are imperfect, e.g. out-of-round, shifted, and/or with raised buffing lines. The flash ring is not removed from these improperly seated balls and these balls are separated from the other balls which are buffed.

The step of separating can occur at any point in the process after the checking has been completed. Preferably the separation occurs at the end of the buffing cycle. In order for this to take place, the checking station signals ahead to instruct that the flash ring is not to be removed from the improperly seated balls.

Removal of the flash ring can be accomplished by grinding, cutting, and/or sanding. It is preferred to use a combination of cutting and sanding. Preferably, a cutter is first used to remove part of the flash ring, then two continuous belt sanders, first a rough belt and then a fine belt, are used to remove the remaining excess cover stock. In a most preferred embodiment, a brush is used to remove any remaining particles. Using a cutter first, prior to sanding, insures that each remaining portion of the flash ring presented to the sanding stations is fairly uniform with respect to its distance of protrusion from the ball.

These and other aspects of the present invention may be further understood from the following detailed description.

BRIEF DESCRIPTION OF THE DRAWINGS

A preferred embodiment of an apparatus in accordance with the invention is shown in FIGS. 1-11. FIGS. 1-11 illustrate aligner 10, punch 12, car 14, loading station 16, holder 18, check station 20, cutting station 22, rough sanding station 24, fine sanding station 26, brush station 28, and sorting station 30.

FIG. 1 illustrates a preferred embodiment of aligner 10, punch 12 and car 14.

Figure 1:
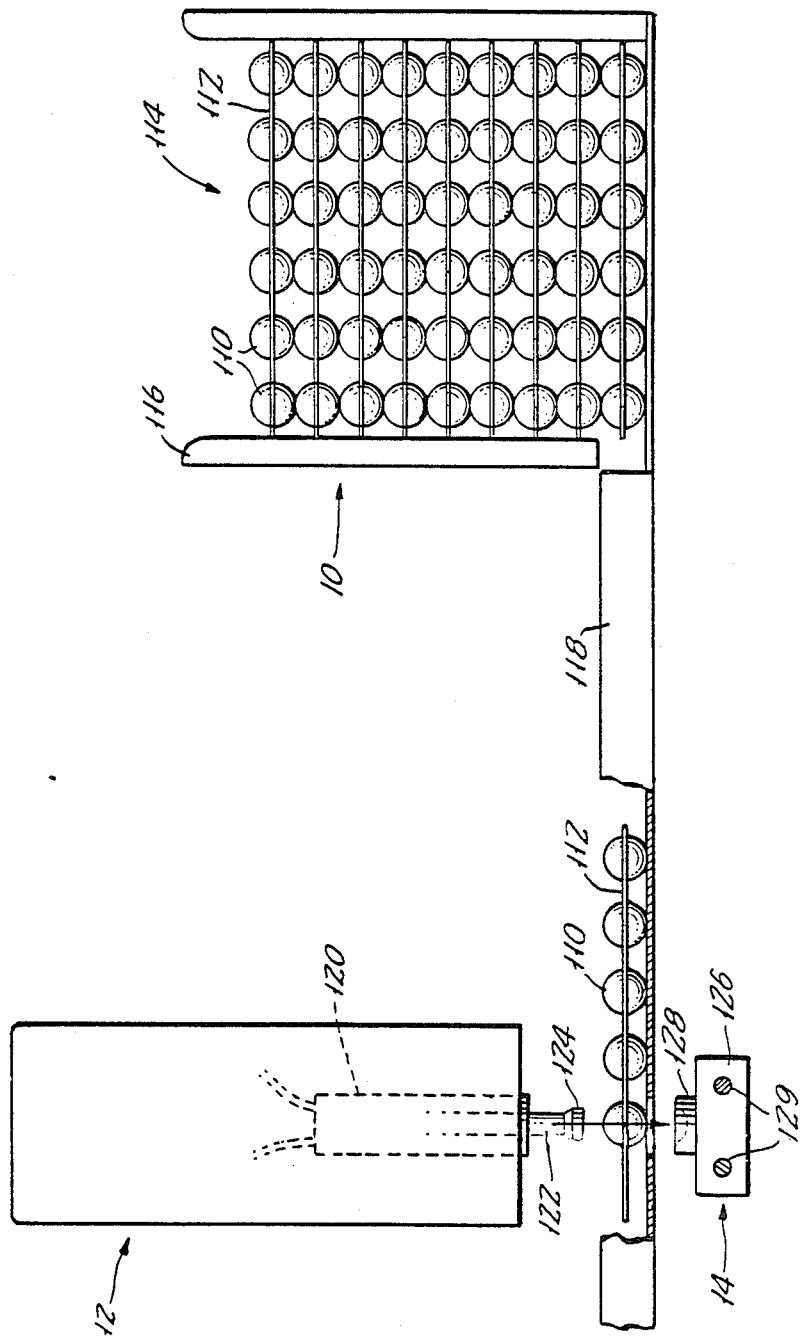
FIG. 1 is a preferred embodiment of the present invention illustrating a matrix aligner, a punch and a car.

Balls 110 are held by flash ring and overflow 112 which interconnect each ball to form matrix 114 inside frame 116. Frames 116 are vertically stacked so that a plurality of matrices 114 are stacked one on top of another. The bottom matrix 114 is moved along track 118 to punch 12.

Punch 122 comprises a conventional pneumatic cylinder 120 with piston 122 connected to die 124. Die 124 is preferably in the shape of a ball cup mold having a dimple pattern similar to that of golf ball 110. As ball 110 is aligned with die 124, die 124 pushes ball 110 out of matrix 114 into car 126 which has a plurality of cups 128 which are similar to ball cup molds and preferably have a dimple pattern similar to that of golf ball 110. Dual rails 129 move car 126 between punch 12 and loading station 16.

Truck 126 moves ball 110 to loading station 16.

Figure 2:
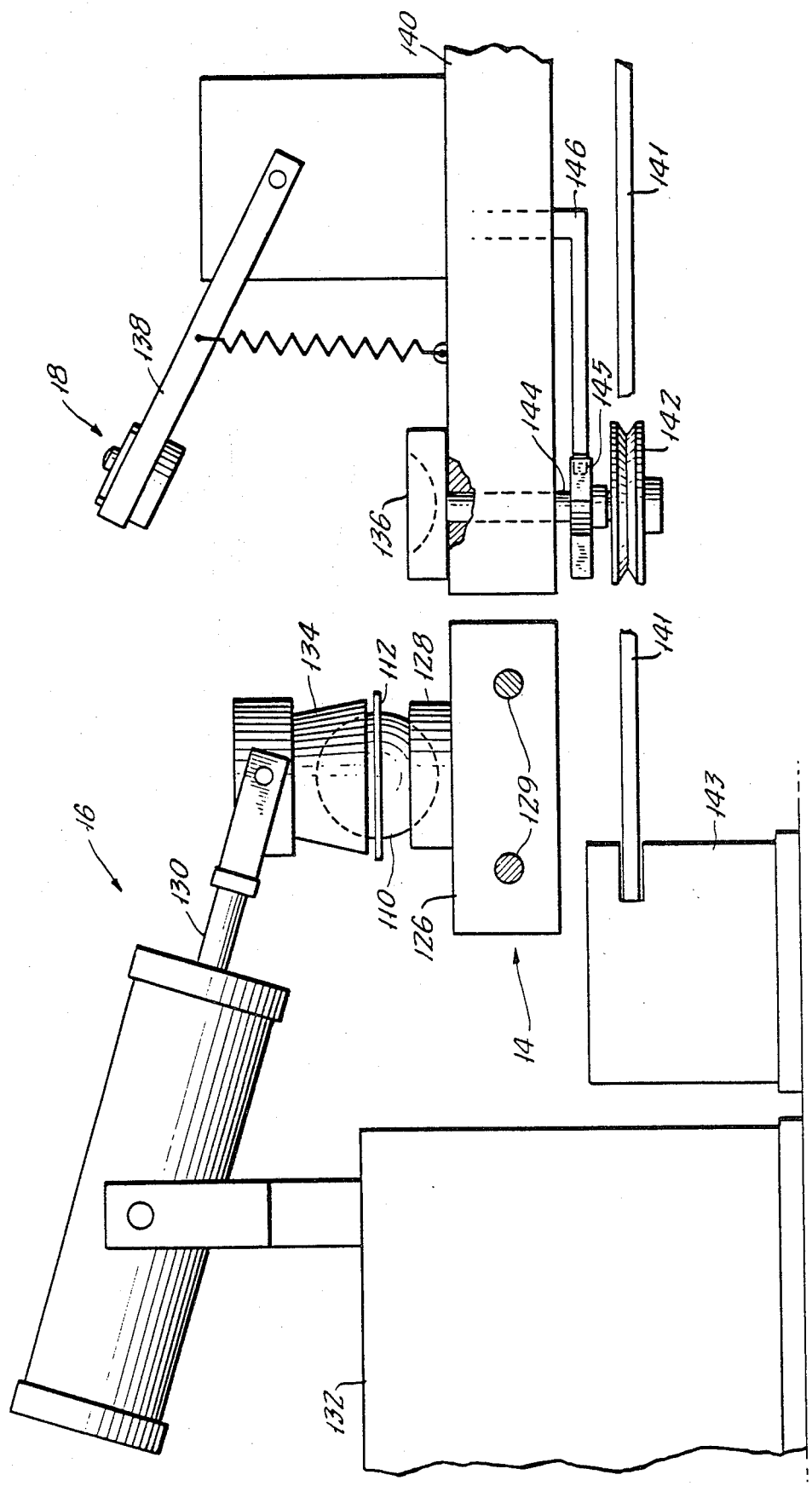
FIG. 2 is a preferred embodiment of the present invention illustrating a loader unloading the car.

FIG. 2 illustrates a preferred embodiment of loading station 16 and holder 18. Loading station 16 has telescoping arm 130 attached to control box 132 for controlling the movement of arm 130. Arm 130 is equipped with vacuum head 134 which can remove ball 110 from car 126 and holds ball 110 while arm 130 moves ball 110 to holder 18.

Figure 3:
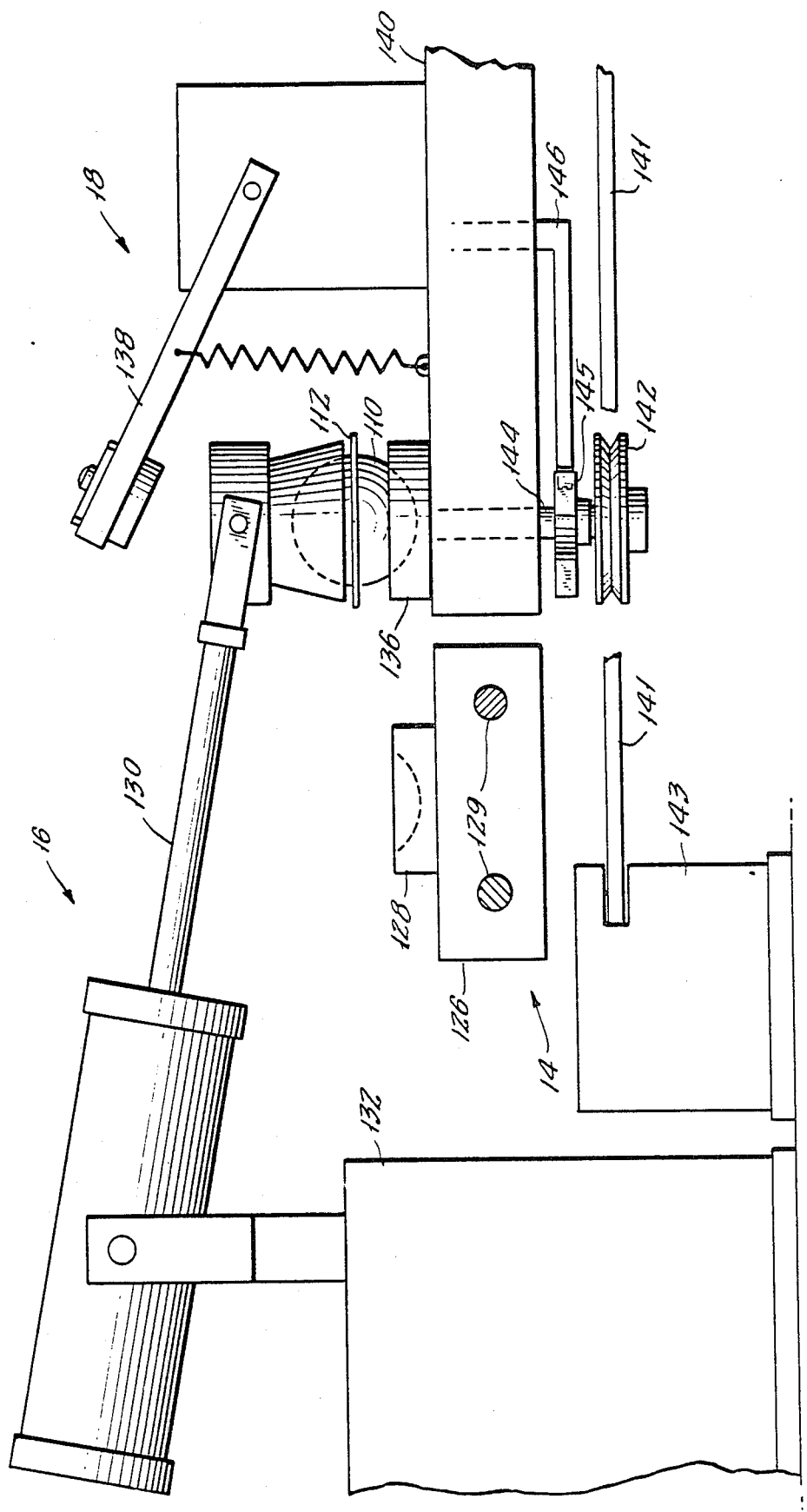
FIG. 3 is a preferred embodiment of the present invention illustrating the loader loading a holder.
Figure 4:
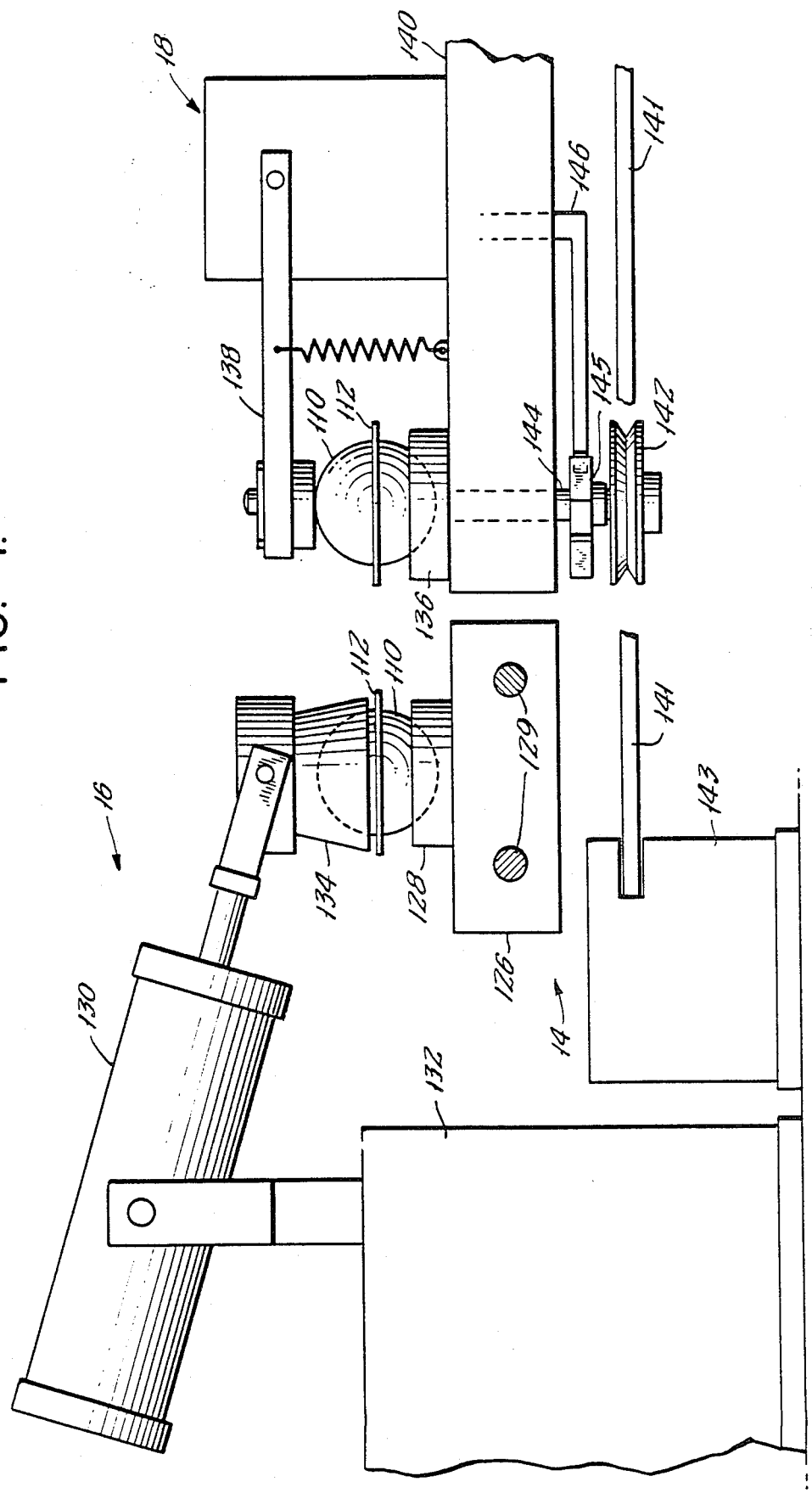
FIG. 4 is a preferred embodiment of the present invention illustrating the holder holding the ball.

FIG. 3 shows ball 110 placed in holder 18 by arm 130. Holder 18 preferably has a holder cup 136 which is similar to a ball cup mold and has a dimple pattern similar to the dimple pattern on ball 110. Once ball 110 has been moved to holder 18 and placed in holder cup 136, the vacuum in vacuum head 134 is released and arm 130 moves back to pick up another ball. When ball 110 is in holder cup 136 of holder 18, holding arm 138 is lowered to securely hold ball 110 in the holder cup 136, FIG. 4.

Holder 18 is mounted on a circular rotating index table 140 around which loading station 16, check station 20, cutting station 22, rough sanding station 24, fine sanding station 26, brush station 28, and ball sorting station 30 are positioned. Rotating table 140 is equipped with a plurality of holders 18 so that, as table 140 rotates, another holder 18 is positioned opposite loading station 16 for loading with ball 110. Each holder cup 136 spins at check station 20, cutting station 22, rough sanding station 24, fine sanding station 26, and brush station 28. Preferably this is accomplished by endless belt 141 which is connected to pulley 142 and to motor 143. Pulley 142 is mounted on shaft 144. Shaft 144 is connected to holder cup 136. The path of belt 141 under table 140 is such that belt 141 does not engage pulley 142 at loading station 16. See FIGS. 3-8 and 10.

Figure 5:
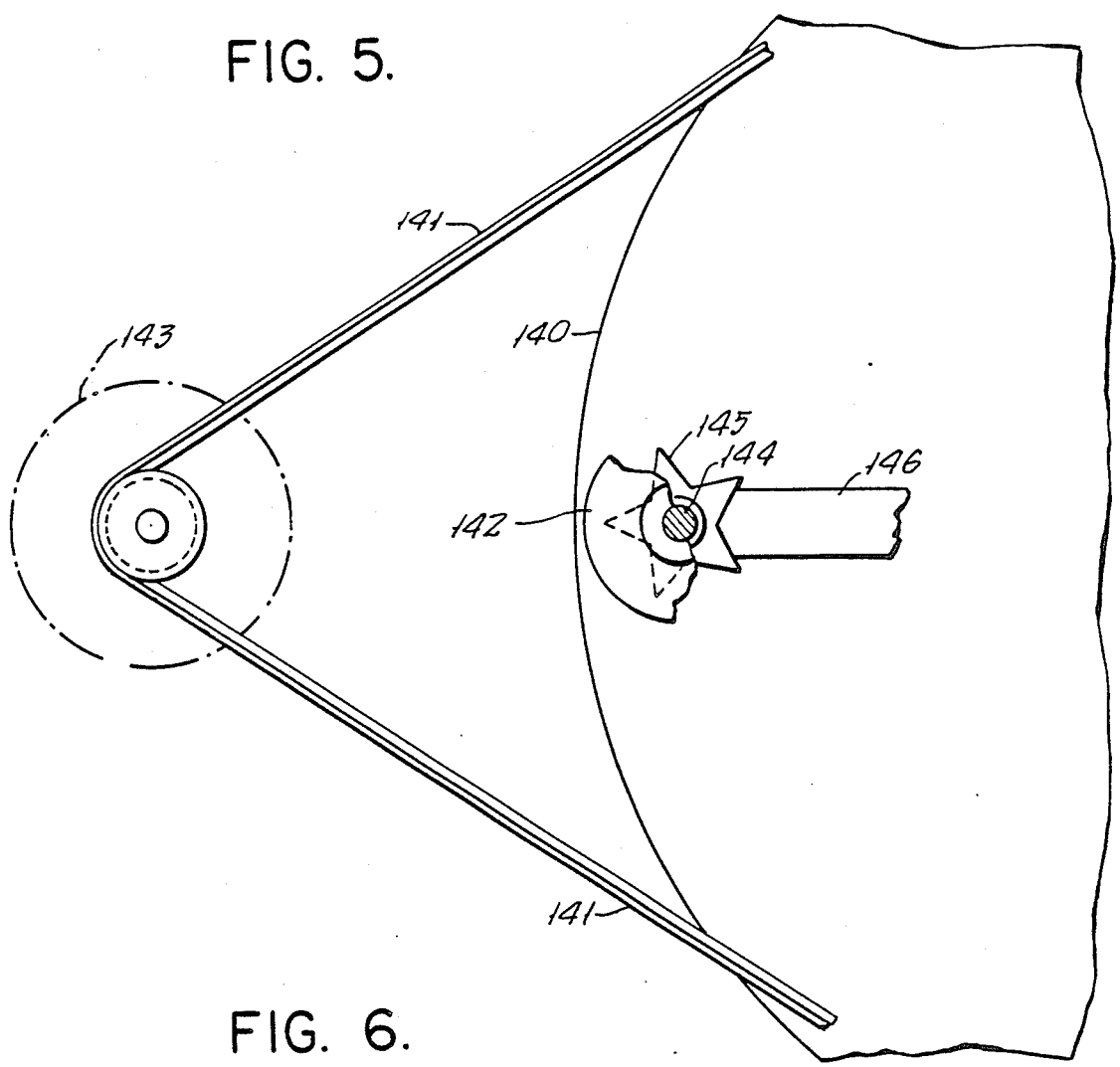
FIG. 5 illustrates a preferred embodiment of the present invention illustrating a bottom view of the holder opposite th loader.

FIG. 5 illustrates a bottom view of holder 18 showing star wheel 145 mounted on shaft 144. Star wheel 145 is a five pointed wheel as shown in FIG. 5. Star wheel 145 rotates with shaft 144. At loading station 16, spring loaded stop arm 146 engages star wheel 145 and stops the rotation of cup 136 at one of five predetermined locations. By stopping cup 136 at one of five predetermined locations, cup 136 is properly oriented to receive ball 110 and to thereby maintain proper or:rentation of golf ball 110. After arm 138 is lowered to secure ball 110, stop arm 146 is drawn away from star wheel 145.

Figure 6:
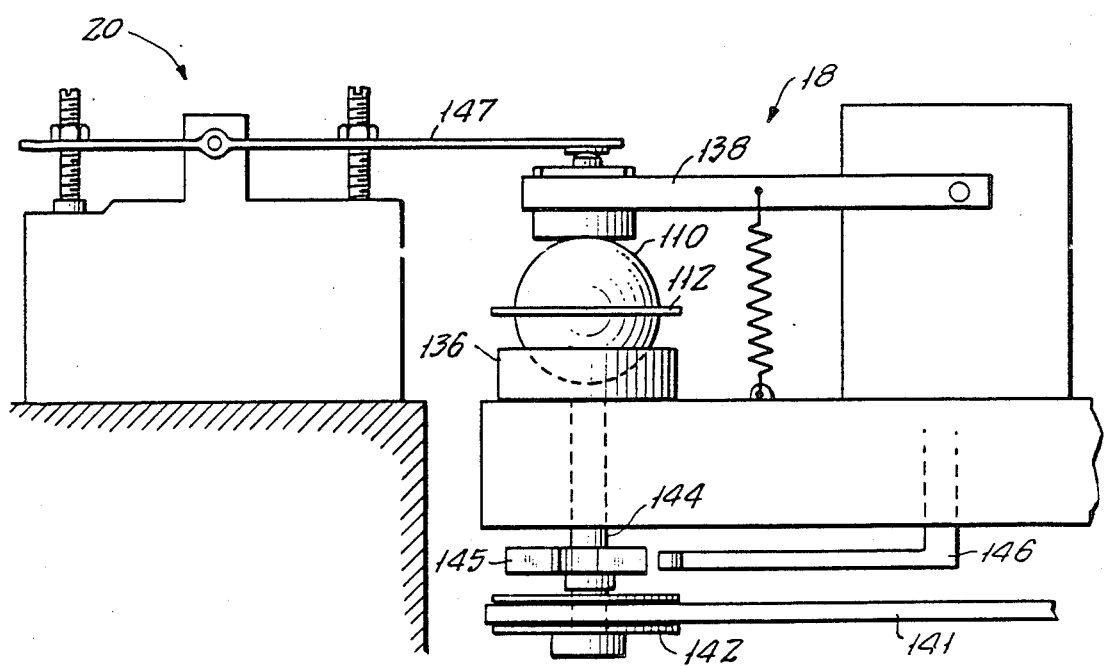
FIG. 6 is a preferred embodiment of the present invention illustrating the position of the ball being checked to confirm correct horizontal orientation of the flash ring prior to removing the flash ring.

The first station on rotating table 140 after loading station 16 is check station 20. FIG. 6 illustrates a preferred embodiment of check station 20. Sensor arm 147 allows holder arm 138 to pass freely under sensor arm 147 if ball 110 is properly seated in holder cup 136. If ball 110 is improperly seated in cup 136, arm 138 will be higher and it will force sensor arm 147 up. While a golf ball which is improperly seated will still proceed around the table, it will not be buffed. As detailed later, it will be "kicked out".

Figure 7:
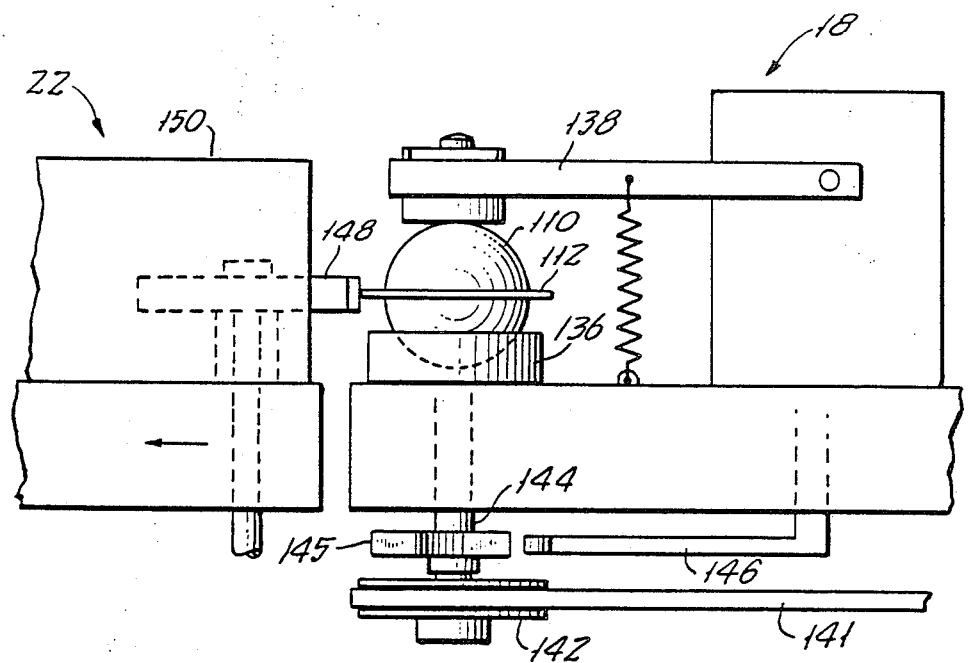
FIG. 7 is a preferred embodiment of the present invention illustrating a cutter.

Each ball 110 next moves to cutting station 22 where a portion of flash ring 112 is removed from each properly seated ball, FIG. 7. Any means of cutting may be employed. Preferably blade 148 is used. It has been found that a high speed rotary cutter with a tungsten carbide blade is most preferred. Blade 148 is mounted in a housing 150 which withdraws if ball 110 is improperly seated. Blade 148 cuts off most of flash ring 112. The amount of flash ring 112 cut off is determined by the position of blade 148 with respect to ball 110. The amount of flash ring 112 on ball 110, i.e. the thickness and the distance it protrudes from the surface of ball 110, varies from ball to ball. The position of holder cup 136 with respect to cutting blade 148 is always the same. Thus, the position of ball 110 to blade 148 is always the same. This means that each ball, after engaging blade 148, leaves cutting station 22 with flas ring 112 protruding substantially the same diameter from the axis of rotation of the ball. Cutting station 22 thus reduces the wear on sanding stations 24 and 26 by presenting sanding stations 24 and 26 with flash rings that protrude only a minor distance from the surface of ball 100.

At cutting station 22, cup 136 spins which allows blade 148 to operate on all of flash ring 112.

Figure 8:
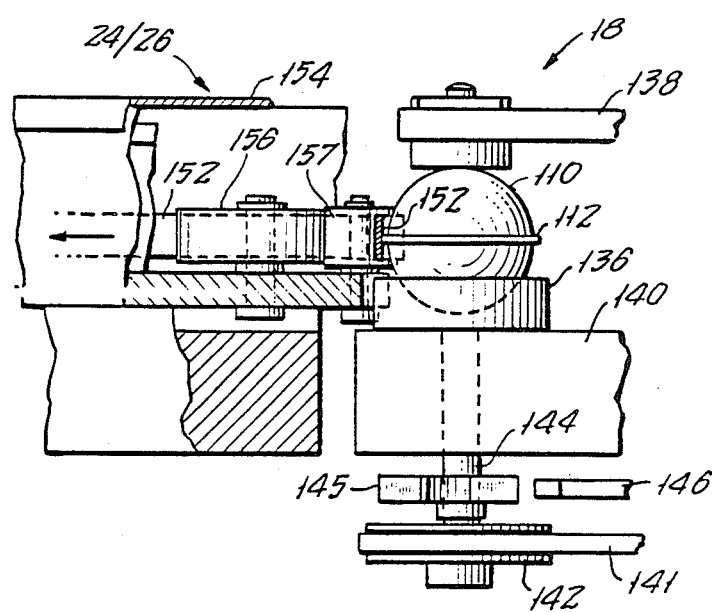
FIG. 8 is a side view of a preferred embodiment of the present invention illustrating a continuous belt sander.

Ball 110 next moves to the rough sanding station 24 where continuous sanding belt 152 of a moderately coarse abrasive sands off a portion of the flash line as shown in FIG. 8. Rough sanding belt 152 resides in housing 154. At rough sanding station 24 cup 136 spins due to belt 141 and motor 143. Spinning cup 136 causes ball 110 to spin which, in turn, allows sanding belt 152 to operate on all of flash ring 112. In order to avoid excessive wear at one spot or along one horizontal line on continuous sanding belt 152, sanding belt 152 preferably oscillates in the vertical plane so that flash ring 112 is presented with different horizontal portions of continuous sanding belt 152.

Figure 9:
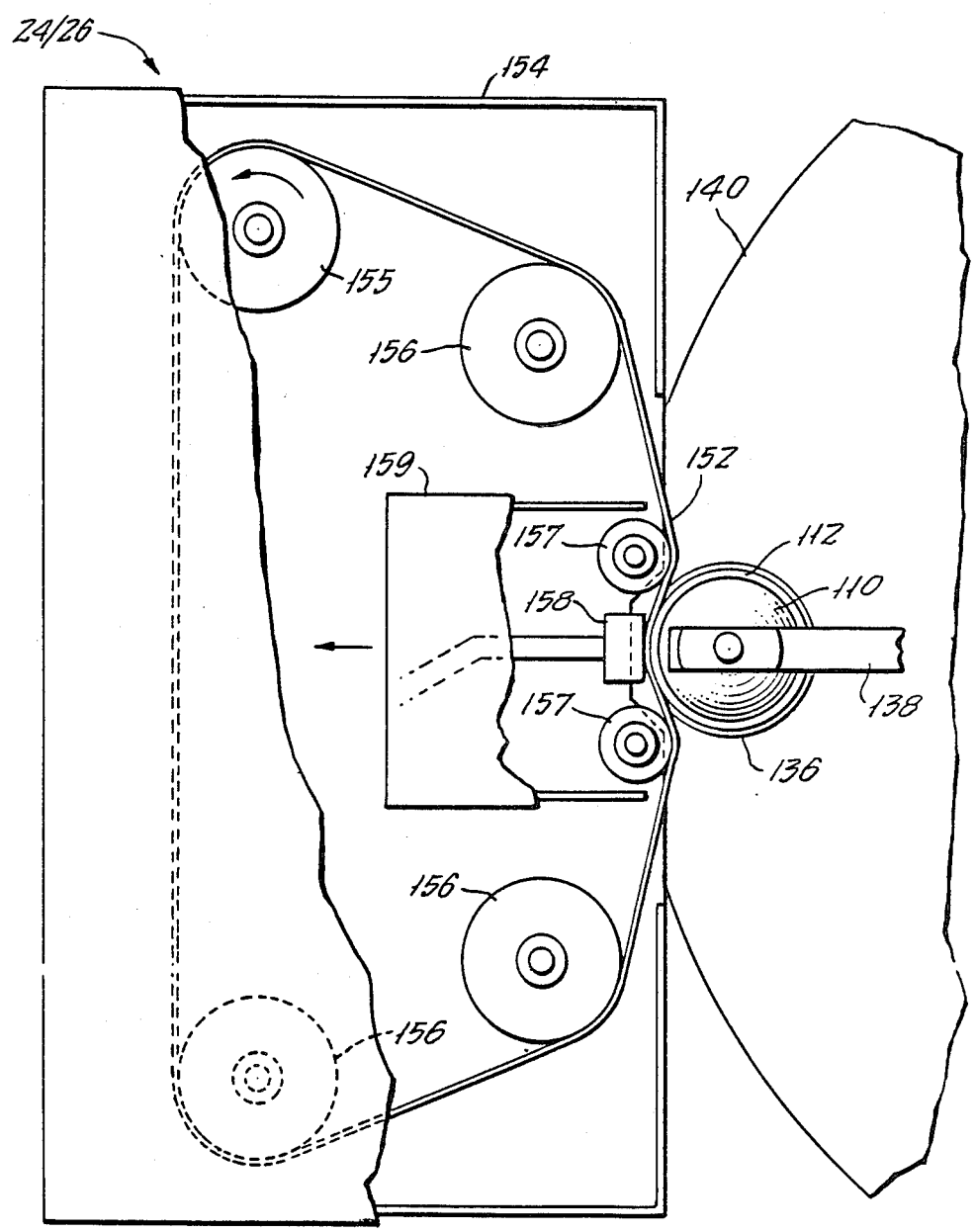
FIG. 9 is a top view of the sander of FIG. 8.

FIG. 9 is a top view of rough sanding station 24. Rough belt 152 is driven by drive capstan 155. Capstans 156 are used to guide belt 152. Capstans 157 and shoe 158 press belt 152 against ball 110. Capstans 157 and shoe 158 are adjusted such that belt 152 can deflect around ball 110 as illustrated in FIG. 9.

Capstans 157 and shoe 158 are mounted in slide assembly 159. Slide assembly 159 withdraws when ball 110 is improperly seated. This stops belt 152 from engaging ball 110.

Fine sanding station 26 is identical to rough sanding station 24 except that continuous belt 152 is a finer sand paper than the rough sand paper used in rough sanding station 24.

Ball 110 is then moved to brush station 28.

Figure 10:
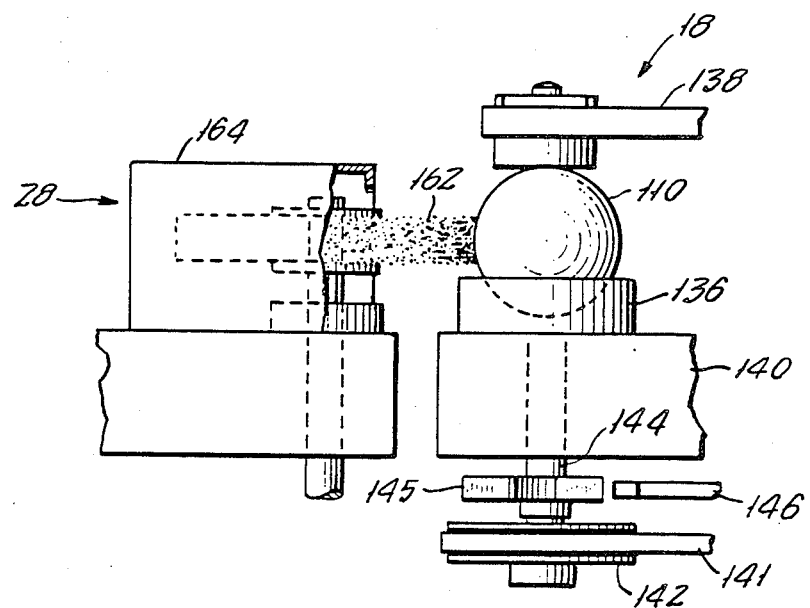
FIG. 10 is a side view of a preferred embodiment of a brusher.

FIG. 10 shows a preferred embodiment of brush station 28 which is made up of brush 162 which resides in housing 164. Brush 162 is a rotating brush which removes any loose or dangling bits of cover stock still remaining on the ball. Preferably, brush 162 comprises carbide particles embedded in the bristles, the bristles preferably being made of nylon.

At brush station 28, belt 141 and motor 143 cause cup 136 to spin which, in turn, causes ball 110 to spin while brush 162 also spins.

Finally, holder 18 moves to sorting station 30.

Figure 11:
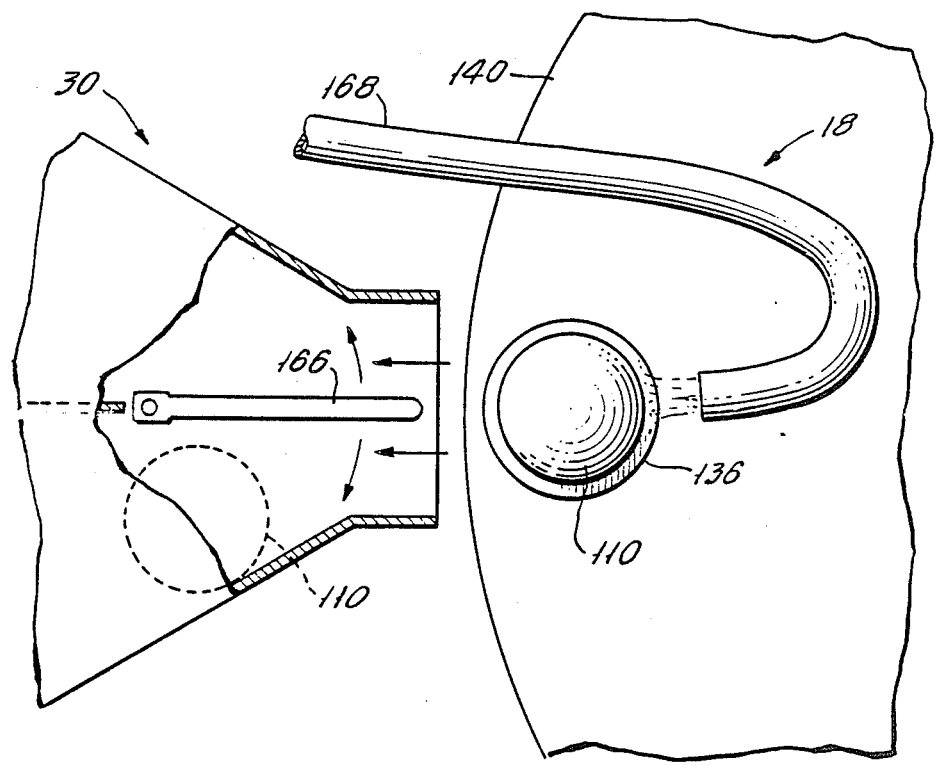
FIG. 11 is a top view of a preferred embodiment of a sorter.

FIG. 11 is a top view of a preferred embodiment of sorting station 30. Sorter arm 166 swings either left or right as shown in FIG. 11 depending upon the signal received from check station 20 as to whether or not ball 110 was properly seated at the beginning of the cycle. Air hose 168 then blows ball 110 out of cup 136.

Balls that were improperly seated are sorted into an unbuffed bin and can be sent back to the beginning to be reseated at loading station 16 or buffed by hand so long as the balls were only wrongly oriented and not imperfect. If they are imperfect balls, e.g. out-of-round, shifted, or with raised buffing lines, the balls are generally considered as "rejects".

The sorting step can be performed anywhere on the round rotating table so long as it is after the checking station.

The use of a round rotating table with the holder fixed to the table is preferred; however, a linear or other type of configuration could be used, e.g. a continuous conveyor belt.

Aligner 10, punch 12 and car 14 can be eliminated if the balls are removed from the matrix by some other means and if another automatic or hand system is used to orient and load the balls such that the flash ring is in the horizontal.

It is preferred that a combination of cutter, rough sander, fine sander and brush be used to remove the flash ring. However, it is possible to use just a cutter and sander or just a sander.

It will be understood that the claims are not limited to the preferred embodiments of the present invention herein chosen for the purpose of illustration, and that the claims are intended to cover all changes and modifications of the preferred embodiments of the present invention which do not constitute a departure from the spirit and scope of the present invention.

What is claimed is:

1. A method for buffing a flash ring on a golf ball comprising the steps of:
    subjecting the golf ball to a step of automatically orientating the golf ball such that the flash ring is in a predetermined plane;
    (b) automatically checking the orientation of the golf ball with a sensor to determine if the golf ball is properly seated or improperly seated in a holder
    (c) designating the golf ball as either a properly seated golf ball or an improperly seated golf ball; and
    (d) sanding the flash ring from each properly seated golf ball by means of a continuous sanding belt that deflects partially around said golf ball during sanding thereby producing a buffed golf ball.

2. The method of claim 1 wherein the sanding step comprises a first step of rough sanding and a second successive step of fine sanding said rough sanding step being accomplished by means of a continuous rough sanding belt that deflects partially around said golf ball during said rough sanding step and said fine sanding step being accomplished by means of a continuous fine sanding belt that deflects partially around said golf ball during said fine sanding step.

3. The method of claim I further comprising the step of cutting a portion of the flash ring off of each properly seated golf ball prior to the sanding step.

4. The method of claim 1 further comprising the step of sorting the properly seated golf ball from the improperly seated golf ball.

5. A method of removing a flash ring on a golf ball comprising:
    (a) aligning a matrix of golf balls in a predetermined plane;
    (b) punching a plurality of golf balls from the matrix onto a car;
    (c) moving the car containing golf balls to a loader;
    (d) loading each golf ball into a holder;
    (e) holding each golf ball such that the flash ring is in a predetermined plane;

(f) automatically checking the golf ball with a sensor to confirm that the golf ball is properly seated such that the flash ring on the golf ball is in the predetermined plane;
(g) cutting the flash ring from the ball to a uniform diameter;
(h) sanding the remaining flash ring from the ball by means of a continous sanding belt that deflects partially around said golf ball during sanding; and
(i) brushing the ball thereby removing the flash ring from the golf ball.

6. The method of claim 5 further including the step of sorting the balls into either properly seated or improperly seated bins.

7. The method of claim 5 wherein the sanding step comprises a rough sanding step and a fine sanding step said rough sanding step being accomplished by means of a continuous rough sanding belt that deflects partially around said golf ball during said rough sanding step and said fine sanding step being accomplished by means of a continuous fine sanding belt that deflects partially around said golf ball during said fine sanding step.

8. A method for buffing a flash ring on a golf ball comprising the steps of:
   (a) subjecting the golf ball to a step of orienting the golf ball such that the flash ring is in a predetermined plane;
   (b) automatically checking the orientation of each golf ball with a sensor to determine if the golf is properly seated or improperly seated in a holder;
   (c) designating the golf ball as either a properly seated golf ball or an improperly seated golf ball;
   (d) removing the flash ring from each properly seated golf ball by sanding wherein the sanding is accomplished by means of a continuous sanding belt that deflects partially around said properly seated golf ball during sanding thereby producing a buffed golf ball; and
   (e) sorting the properly seated golf ball from the improperly seated golf ball.

9. The method of claim 8 wherein the sanding step comprises a first step of rough sanding and a second successive step of fine sanding said rough sanding step being accomplished by means of a continuous rough sanding belt that deflects partially around said golf ball during said rough sanding step and said fine sanding step being accomplished by means of a continuous fine sanding belt that deflects partially around said golft ball during said fine sanding step.

10. An apparatus for buffing a flash ring on a golf ball comprising:
   (a) a fixed platform;
   (b) for automatically orientating the golf ball in a holder such that flash ring is in a predetermined plane, said means for automatically orientating the golf ball attached to said fixed platform;
   (c) a check station attached to said fixed platform, said check station designating the golf ball as either a properly seated golf ball or an improperly seated golf ball;
   (d) a sanding station attached to said fixed platform for sanding each properly seated golf ball, said sanding station having a continuous sanding belt deflects partially around said properly seated golf ball when said properly seated golf ball is positioned opposite said sanding station during sanding; and
   (e) means for automatically moving said holder containing the golf ball from said means to automatically orient the golf ball to said check station and subsequently from said check station to said sanding station thereby producing a buffed golf ball.

11. The apparatus of claim 10 wherein said sanding station comprises a rough sanding station and a fine sanding station rough sanding station having a continous rough sanding belt that deflects partially around said golf ball when said golf ball is positioned opposite said rough sanding station during rough sanding, said fine sanding station having a continous fine sanding belt that deflects partially around said golf ball when said golf ball is positioned opposite said fine sanding station during fine sanding, and said means for automatically moving said holder, moving said holder from said cutting station to said rough sanding station and subsequently from said rough sanding station to said fine sanding station.

12. The appartus of claim 10 further comprising a cutting station attached to said fixed platform, said cutting station removing a portion of the flash ring from each properly seated ball prior to said properly seated ball advancing to said sanding station.

13. The apparatus of claim 10 further comprising a sorting station for sorting the properly seated golf ball from the improperly seated golf ball.

14. An apparatus for removing a flash ring on a golf ball comprising:
   (a) a fixed platform;
   (b) aligning means for aligning a matrix of golf balls into a predetermined plane, said aligning means attached to said fixed platform;
   (c) punching means for ejecting a golf ball from said matrix, said punching means attached to said fixed platform;
   (d) a car means movably affixed to said fixed platform for receiving said ejected golf ball and for moving the ejected golf ball to a loading means;
   (e) said loading means affixed to said fixed platform and said loading means for unloading said car means and for loading the golf ball into a holding means;
   (f) said holding means for receiving said golf ball from said loading means and for moving said golf ball to a checking means, then to a cutting means, then to a sanding means, and finally to a brush means in such order;
   (g) said checking means to determine if said golf ball is properly seated in said holder, said checking means attached to said fixed platform;
   (h) said cutting means for cutting said flash ring to a predetermined diameter, said cutting means attached to said fixed platform;
   (i) said sanding means for removing the remaining flash ring, said sanding means having a continuous sanding belt that deflects partially around said golf ball when said golf ball is positioned opposite said sanding means during sanding, said sanding means attached to said fixed platform; and
   (j) said brush means for brushing particles off of the golf ball, said brushing means attached to said fixed platform.

15. The appartus of claim 14 wherein the sanding means comprises a rough sanding means and a fine sanding means, said rough sanding means having a continuous rough sanding belt that deflects partially around said golf ball when said golf ball is positioned opposite said rough sanding means during rough sanding, said fine sanding means having a continuous fine sanding belt that deflects partially around said golf ball when said golf ball is positioned opposite said fine sanding means during fine sanding, and said holding means moving said golf ball from said cutting means to said rough sanding means and subsequently from said rough sanding means to said fine sanding means.

* * * * *

UNITED STATES PATENT AND TRADEMARK OFFICE
CERTIFICATE OF CORRECTION

PATENT NO. : 4,779,387
DATED : October 25, 1988
INVENTOR(S) : Walter L. Reid et al.

It is certified that error appears in the above-identified patent and that said Letters Patent is hereby corrected as shown below:

Column 3, line 38, change "th" to --the--; line 67, change "122" to --12--.

Column 4, line 51, change "or:rentation" to --orientation--.

Column 5, line 12, chage "flas" to --flash--; line 17, change "100" to --110--.

Column 6, line 31, before "subjecting" insert --(a)--; line 53, change "I" to --1--.

Column 7, line 8, change "continous" to --continuous--; line 31, after "golf" (second instance) insert --ball--; line 49, change "golft" to --golf--; line 54, before "for" insert --means--; line 56, change "orientating" to --orienting--; line 65, before "deflects" insert --that--.

Column 8, line 8, before "rough" insert --said--; lines 8 and 9, change "continous" to --continuous--; line 12, change "continous" to --continuous--; line 20, change "appartus" to --apparatus--; line 64, change "appartus" to --apparatus--.

Signed and Sealed this

Second Day of May, 1989

Attest:

DONALD J. QUIGG

Attesting Officer

Commissioner of Patents and Trademarks